March 5, 1963 D. S. LECRONE ET AL 3,080,079

TRANSFER MECHANISM

Filed Oct. 14, 1959 8 Sheets-Sheet 1

INVENTORS

DALE S. LECRONE

LEWIS G. GROSSI

BY Richard G. Wynne

John A. Finken

ATTORNEYS

March 5, 1963 D. S. LECRONE ET AL 3,080,079

TRANSFER MECHANISM

Filed Oct. 14, 1959 8 Sheets-Sheet 2

INVENTORS
DALE S. LECRONE
LEWIS G. GROSSI

BY Richard G. Wynne
John A. Finken

ATTORNEYS

INVENTORS
DALE S. LECRONE
LEWIS G. GROSSI
BY Richard G. Wynne
John A. Finken
ATTORNEYS

INVENTORS
DALE S. LECRONE
LEWIS G. GROSSI

BY Richard G. Wynne
John A. Finken
ATTORNEYS

March 5, 1963 D. S. LECRONE ET AL 3,080,079

TRANSFER MECHANISM

Filed Oct. 14, 1959 8 Sheets-Sheet 5

INVENTORS
DALE S. LECRONE
LEWIS GROSSI

BY Richard G. Wynne
John A. Finken
ATTORNEYS

INVENTORS
DALE S. LECRONE
LEWIS G. GROSSI
BY Richard G. Wynne
John A. Finken
ATTORNEYS

TRANSFER MECHANISM

Filed Oct. 14, 1959 8 Sheets-Sheet 7

INVENTORS
DALE S. LECRONE
LEWIS G. GROSSI
BY Richard G. Wynne
John A. Finken
ATTORNEYS March 5, 1963 D. S. LECRONE ET AL 3,080,079

TRANSFER MECHANISM

Filed Oct. 14, 1959 8 Sheets-Sheet 8

INVENTORS

DALE S. LECRONE

LEWIS G. GROSSI

BY Richard G. Wynne

John A. Fenken

ATTORNEYS

United States Patent Office 3,080,079

Patented Mar. 5, 1963

3,080,079

TRANSFER MECHANISM

Dale S. Lecrone, York, and Lewis G. Grossi, Waynesboro, Pa., assignors to Alto Company, York, Pa., a partnership Filed Oct. 14, 1959, Ser. No. 846,396
10 Claims. (Cl. 214—309)

This invention relates to a transfer mechanism for removing soft, delicate articles from a container and transferring them for further handling, the container also being transferred for further handling.

More particularly, this invention relates to a vacuum-type mechanism whereby baker products (hot or cold) can be removed from their baking pan and transferred into a packaging line, the pan being transferred for cleaning and storage or immediate re-use.

The handling of individual or clustered rolls, such as hot dog rolls (weiner or finger), and hamburger rolls (sandwich or barbecue) has become a very important problem in the baking industry. The rolls are preferably removed from their pans and then sliced prior to final packaging. The slicing operation requires proper orientation of the rolls, this proper orientation being originally established by specially designed baking pans. The instant invention is directed toward maintenance of this established orientation as the rolls are removed from the pans and delivered to the slicing station and the packaging station.

Attempts to handle bakery products by the vacuum lifting process have been attempted in the past with some success. A damage factor, however, has prevented commercial acceptance on a large scale of such processes. Hot rolls have a crust which is fragile and pressure of low magnitudes on this crust causes fracture thereof producing a product which, in the bakery field, is considered somewhat less than satisfactory.

This invention enables the use of the vacuum technique on hot rolls as well as cold rolls by the provision of a perforate means through which air is drawn to produce a suction force, the perforate means having a bakery product engaging skin of predetermined thickness and softness to enable deforming contact thereof with the bakery product without material deformation of the bakery product. In other words, the skin on contact with the varying curved surfaces of a bakery product, conforms to this surface over a substantial area to distribute the required suspension force over the area thereby reducing the pressure and preventing the formation of severe stress lines and fractures on the product.

This process is accomplished by means of an apparatus wherein bakery pans are first oriented into a predetermined path of travel and then moved at a controlled speed through a removal zone. The perforate means is progressively moved relative to the products in the pan until final complete engagement is made therewith and a suspension force of the required amount is developed on the product. As the perforate means and pan move downstream into a suspension zone, the pan and product are vertically moved relative to each other. The product is then in a suspended condition and is carried out of the removal zone through the suspension zone to a final transfer zone where the suspension force is cut off and the product allowed to drop or be carried away by a conveying means.

As will be seen in the description hereinafter, the machine includes means for varying the height of the removal zone, means for adjusting the guide means for properly orienting pans of different dimensions, and means for adjusting the position of the final conveying means at the downstream end of the suspension zone.

These adjustments are of vital importance as different operational conditions are encountered in the handling of cluster rolls as distinguished from separate rolls. Means are also provided for varying the suction effect at the perforate means, less suction being required for a cluster roll under normal circumstances.

The perforated means is provided by a continuous belt of suitable material capable of providing the required predetermined thickness and softness to enable deforming contact thereof with a bakery product without material deformation of the bakery product. It will be readily understood that the belt may be formed of a single material having properties of softness and structural strength suitable for the requirements. Also, it will be recognized that in accordance with normal practice the belt may be formed of numerous plys or layers laminated together to form an integrated belt having the required structural integrity resulting from one material used and the required thickness and softness resulting from a different material.

Preferably, the belt will comprise a multiple ply unit comprising an inner strength ply or backing sheet and a series of longitudinally extending cushion strips of material such as foam rubber, the foam rubber providing the roll engaging skin. The cushion strips are preferably not affixed to the inner strength ply.

This invention also provides for adapting the machine to the handling of numerous arrangements of rolls, as well as shapes of rolls. An endless backing sheet provides the inner ply of the belt and a series of detached longitudinally extending endless cushion strips having their own backing strips integrated therewith engage the inner backing sheet throughout a major portion of their lengths. These cushion strips are of greater length than the continuous backing sheet and pass over a spacing turret whereby their arrangement across the backing sheet may be adjusted in accordance with the roll depanning requirements. Also the number of cushion strips employed may be varied in accordance with the requirements.

The required perforations are formed in a predetermined manner in the integrated belt or in the backing sheet in those modifications where the cushioned strips are employed. The critical specific details of the belt will be set forth hereinafter.

Preferably, separate evacuating means operate on predetermined portions of opposite sides of the longitudinal center line of the belt, longitudinal and transverse vanes providing controlled air flow.

Controlled air flow is also aided and produced by the longitudinally extending cushion strips and an apertured belt means at the final transfer zone.

Other important objects and advantageous features of the invention will be apparent from the following description and accompanying drawings, wherein, for the purpose of illustration herein, a specific embodiment of this invention is set forth in detail, and wherein.

Figures 1, 2:
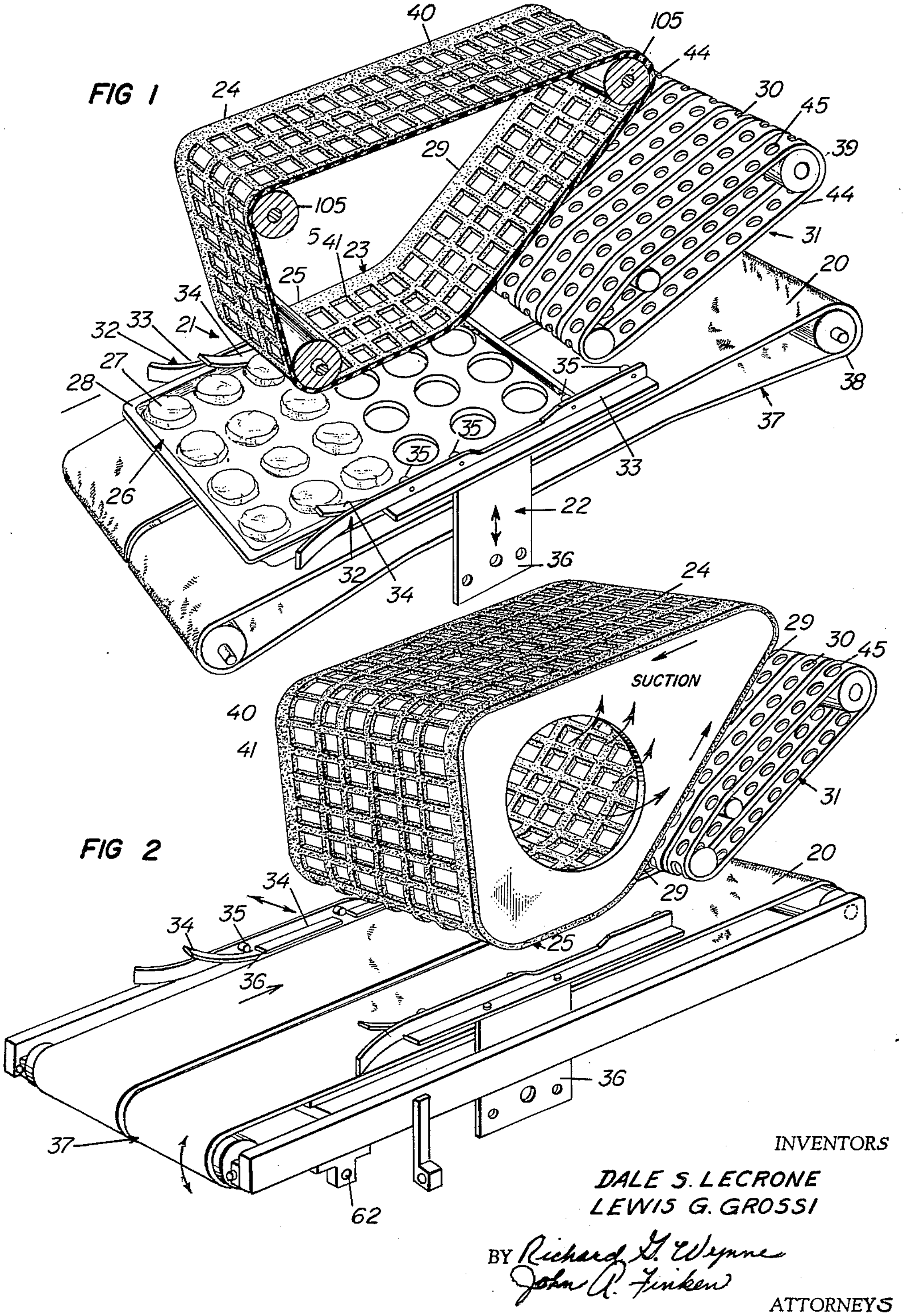
FIG. 1 is a schematic perspective view showing the major units of this invention, portions being cut away for clarity.
FIG. 2 is a view similar to FIG. 1 with structural members shown in a more complete manner.
Figures 3, 4, 5, 6, 7:
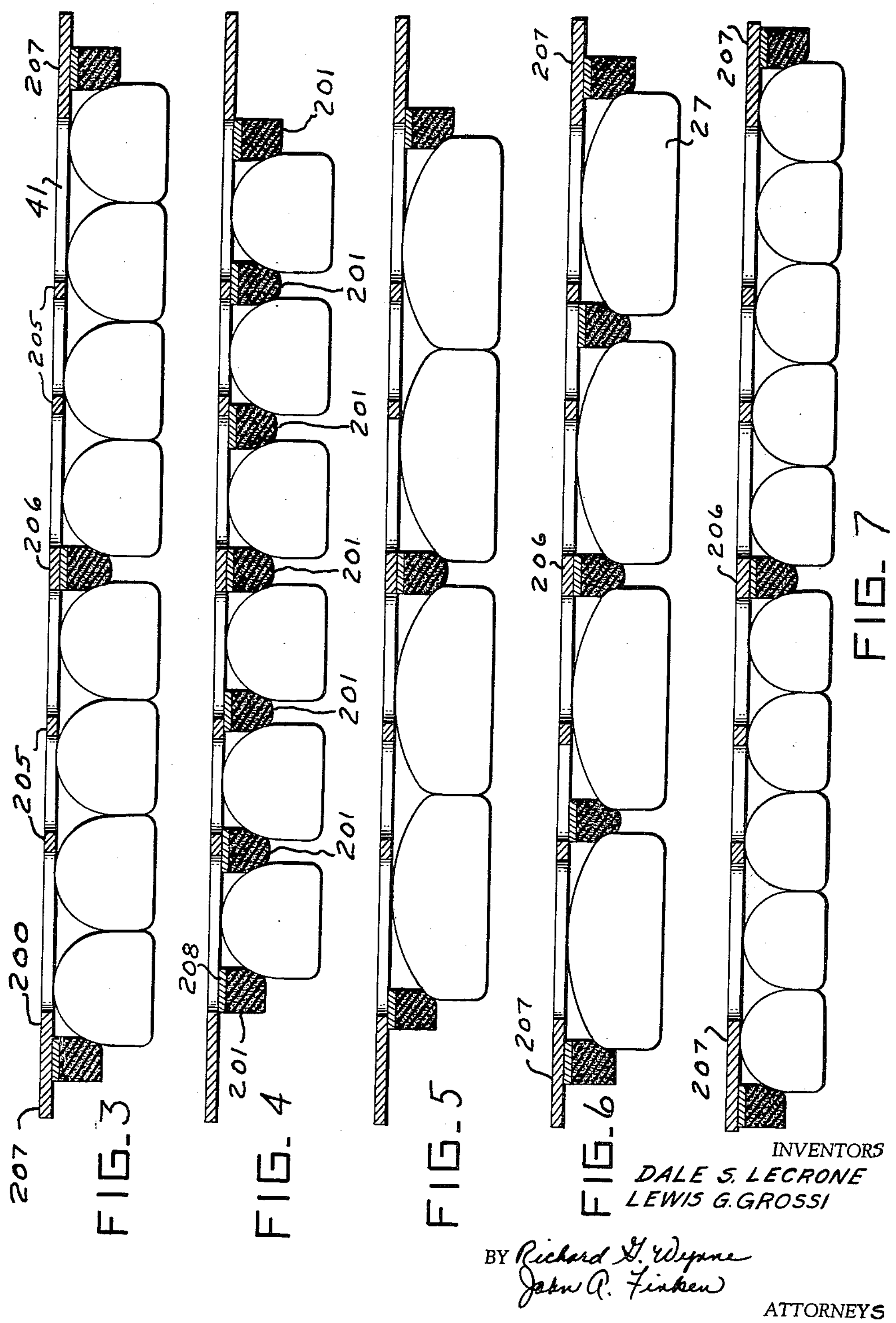
FIG. 3 is a schematic transverse cross sectional view showing a belt arrangement for two clusters of four weiner rolls each.
FIG. 4 is a view similar to FIG. 3 showing a belt arrangement for individual weiner rolls.
FIG. 5 is a view similar to FIG. 3 showing a belt arrangement for two clusters of four sandwich rolls.
FIG. 6 is a view similar to FIG. 3 showing a belt arrangement for individual sandwich rolls.
FIG. 7 is a view similar to FIG. 3 showing a belt arrangement for two clusters of five small weiner rolls.

Referring now to FIGS. 1 and 2, it will be seen that the upper flight 20 of the pan conveyor 37 is arranged to carry pans of rolls 26 into a removal zone 21 where the pan is oriented and guided into and through a predetermined path by guide means 22. As the pan of rolls 26 approaches the removal zone 21, the rolls are brought into engagement with a suspending means 23 which includes a continuous perforated belt 24, the lower flight 25 of which initially contacts the rolls. The belt 24 is moved at the same speed as the pan of rolls 26 and upon formation of a vacuum at the inside surface of the belt 24, the rolls are effected by a suspending force.

As the rolls 27, pan 28 and belt 24 move downstream as an integrated unit through the upstream portion of the removal zone 21, a suspending force is created which is sufficient to suspend the rolls 27. At the downstream end of the removal zone 21, the lower flight 25 and pan conveying upper flight 20 separate. In the embodiment shown the lower flight 25 moves upwardly at an acute angle of about thirty degrees, this suspension flight 29 of lower flight 25 is the portion of the lower flight 25 which separates the rolls 27 from the pans and moves them to a position for further conveyance to a packaging station. The suspension flight 29 defines a suspension zone.

A transfer top flight 30 is positioned in the tapered suspension zone at the downstream end of the removal zone 21, the top flight 30 being part of a wedge transfer belt 31 positioned between the suspension flight 29 and the upper flight 20. When the suspended rolls are separated from their pan a predetermined distance they are released from the suspension flight 29 into engagement with the top flight 30 for final transmission out of the removal zone 21. The pans 28 are conveyed out of the removal zone by the flight 20.

The pan 28 is guided into predetermined accurate alignment for controlled movement through a predetermined path in the removal zone by guide means 22. In the embodiment shown, the upper flight 20 moves in a fixed plane of reference with respect to guide means 22 which is adjusted with respect thereto. As seen in FIGS. 1 and 2, two transversely spaced longitudinally extending guides 32 and 32 are mounted between the upper flight 20 and the lower flight 25 at the upstream end of the removal zone 21, each guide having a vertical bar 33 and a horizontal bar 34, the upstream ends thereof being curved outwardly and upwardly respectively to facilitate receipt of a pan. The horizontal bars have spaces along their lengths in which are mounted a series of rotatable pan edge hold down means or rollers 35 (nylon) which engage the upper longitudinal edge of the pan 28 to insure good frictional driving contact with the upper flight 20 and to flex the pan, if necessary, into required flattened condition. The rollers 35 are transversely mounted in the vertical bars 33 and are of sufficient length to engage only the longitudinal top edge of the pan 28. Horizontal transverse alignment of the pan is accomplished by vertical bars 33 which engage the sides of the pan. Adjustments are accomplished through vertical and horizontal movement of plates 36 in a manner which will be described hereinafter.

As previously mentioned, the upper flight 20 is the fixed plane of reference for adjustment of the guide means 22 so that irregular pans can be accommodated without requiring adjustments of other elements of the mechanism. The pan conveyor 37 is adjustable, however, as will be described, the unit being hinged at a fixed axis at pulley 38 for movement of the pan upper flight 20 relative to the roll lower flight 25 to accommodate rolls of varying basic heights.

Similarly, as will be described, the wedge transfer belt 31 is adjustable about a hinge at a fixed axis at pulley 39 to adjust the distance of its top flight 30 from the suspension flight 29 to facilitate roll transfer therefrom.

The means for exerting a suspension force on the rolls includes in part a vacuum forming system and a perforated means or belt 24, this belt having an outer engaging skin 40 of predetermined thickness and softness to enable deforming contact thereof with the rolls without material deformation of the rolls. The crusts of these rolls 27 are engaged by the belt 24 with an increasing pressure as downstream movement takes place due to the tapered entry zone at the upstream end of the removal zone in the preferred embodiment shown in FIGS. 8 and 9. The skin 40 is sufficiently soft and compressible to conform to the complex surface area curvatures presented by the rolls and in this manner a substantial proportion of the inrushing air through the vacuum holes 41 in belt 24 is stopped thereby producing a suspending force on the rolls.

A particularly important feature of this invention is the prevention of a line forming on the crust of the roll during the suspension operation; this is important when recently baked rolls in a hot or warm condition are to be depanned since the crust of such a roll is brittle and cracks form if pressure is applied. The suspending force of the instant invention is spread over a substantial area of the crust through the unique combination of skin 40 and vacuum holes 41.

The evacuating effect is restricted to an intermediate portion of the lower flight 25 by means of an upstream baffle and a downstream baffle, the suspended rolls on passing the downstream baffle will be released from the suspension force into engagement with the transfer top flight 30 for controlled movement thereby.

The wedge transfer belt 31 is designed to allow passage of air therethrough, a series of independent, spaced belts 44 making up the transfer belt 31. Each belt 44 has a series of circular openings 45 along its length which aids in the delivery of air to the vacuum holes 41. Extensive research has resulted in this unique design as it enables the controlled delivery of air without disturbing the alignment of the rolls as they are transferred from the suspension flight 29 to the top flight 30. Arrows indicating air flow and showing this phenomenon are shown in FIG. 15.

Maintaining the same relative position of the rolls to each other as exists in the pan is of great advantage as it facilitates the packaging operation. The instant invention accomplishes this by the controlled pick-up and deposit of the rolls; in certain instances alignment belts can be placed over the perforated belt 24 to aid in accurate longitudinal alignment of the rolls. In such circumstances, the alignment belts would be preferably of the material used for making the skin 40.

Figure 15:
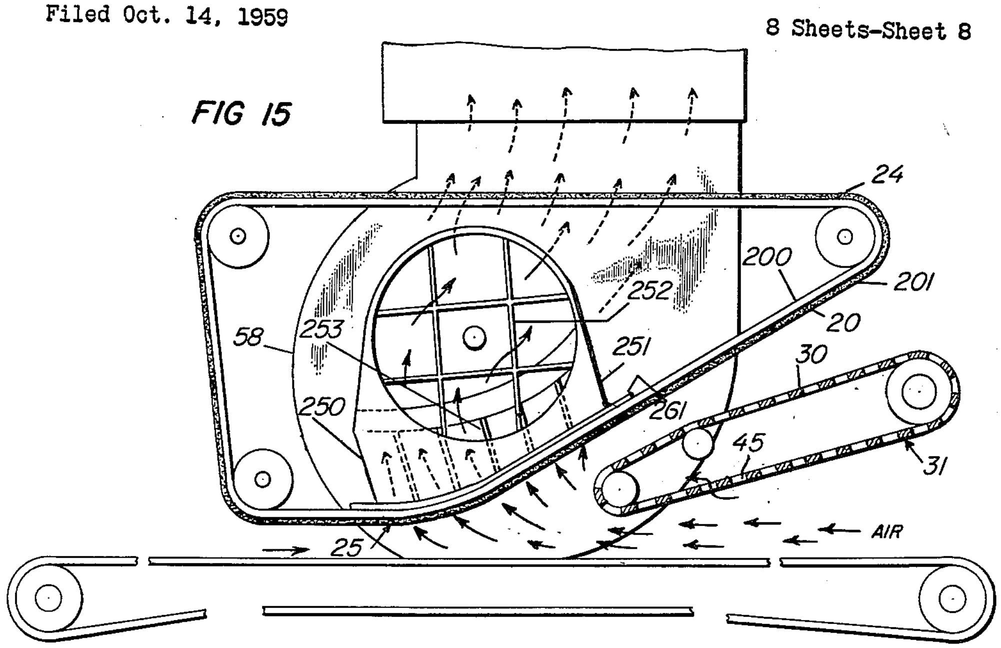
FIG. 15 is a side schematic view showing the arrangement of the belts and the vacuum system; one blower removed for clarity.

As previously mentioned, the perforate means through which the suspension force is exerted on the rolls preferably comprises an endless belt 24 having an inner strength ply 200 and an outer skin ply 201 FIG. 15 of soft material such as sponge rubber. It will be understood that certain materials may have both the required properties of strength and softness enabling the belt to be made from a single material without lamination or superposition. The belt shown in FIGS. 1 and 2 may be of either type.

Figures 3A, 4A, 5A, 6A:
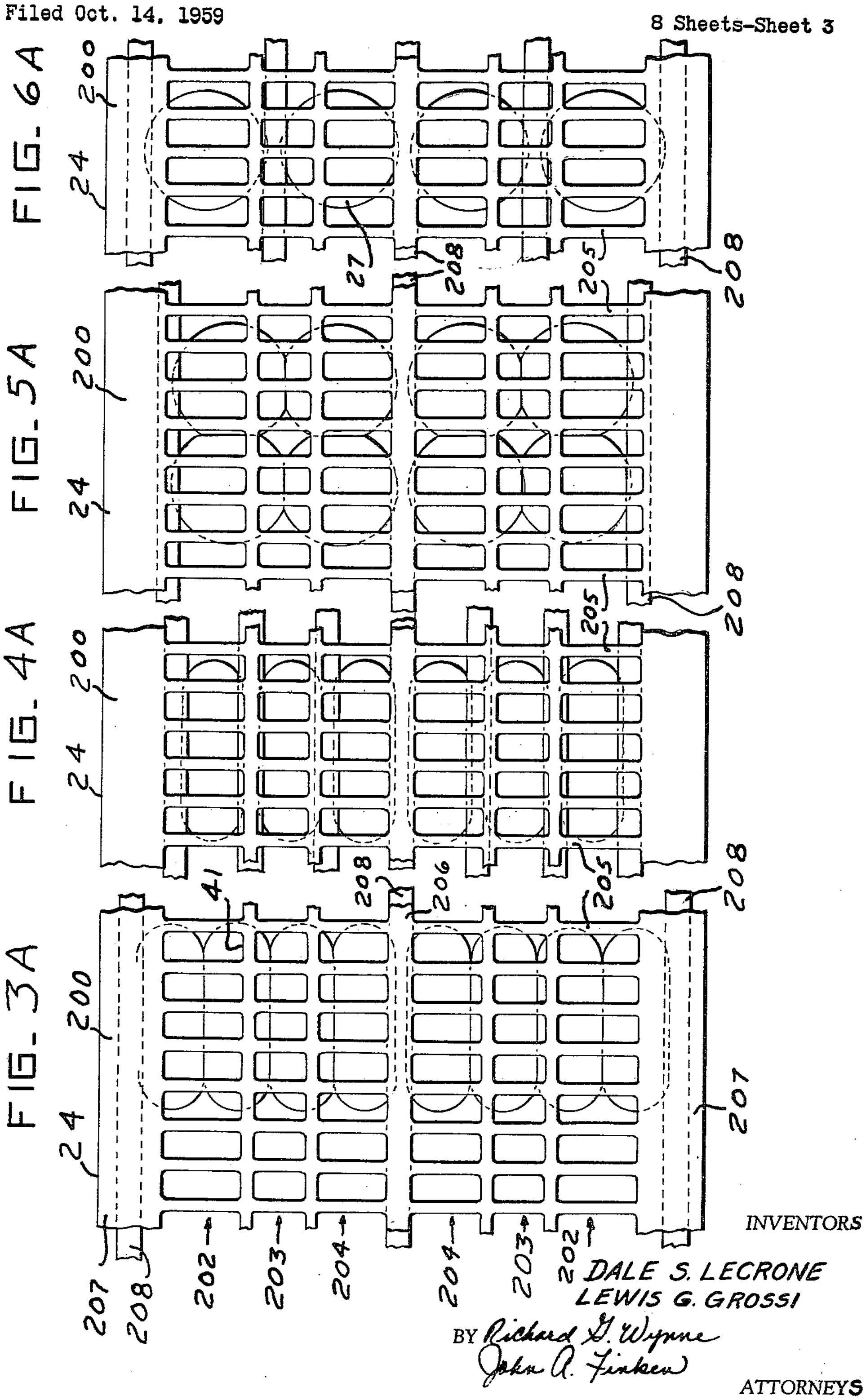
FIG. 3A is a plan view of FIG. 3 showing a portion of the belt.
FIG. 4A is a plan view of FIG. 4.
FIG. 5A is a plan view of FIG. 5.
FIG. 6A is a plan view of FIG. 6.

It will be noted that rectangular apertures 41 are provided in the belt 24. Preferably, the long axis of the rectangle (FIG. 3A) is transverse of the belt and there are three longitudinal rows 202, 203, 204 of rectangular apertures on each side of the longitudinal center line of the belt. The rectangles of the center row 203 have smaller dimensions across the belt than the outer rows 202, 204 adjacent thereto. The latticework 205 defines spacing between the rectangles of preferably about ⅜ of an inch. The larger rectangles have a longitudinal width of ⅞ of an inch and a transverse length of 2⅞ of an inch, the smaller center rectangles having a transverse length of 1¾ of an inch. The central dividing strip 206 at the longitudinal center line of the belt is ¾ of an inch and the side rigidifying panels 207, 207 are 1⅞ of an inch. The overall width of the belt is 20 inches.

Preferably, the roll engaging skin 201 is provided by narrow longitudinally extending cushion strips 208 rather than a complete complementary surface of soft material. The longitudinal strips 208 aid in maintaining the alignment of the rolls and control the air flow inwardly to the evacuating system. As mentioned above in the description, FIGS. 3 to 7 and their related FIGS. 3A to 6A disclose various belt arrangements for various separate buns and clusters. It will be noted that the basic belt design described above provides a most satisfactory inside belt 200 over which the cushion strips 208 can be placed.

Figures 16, 17, 18:
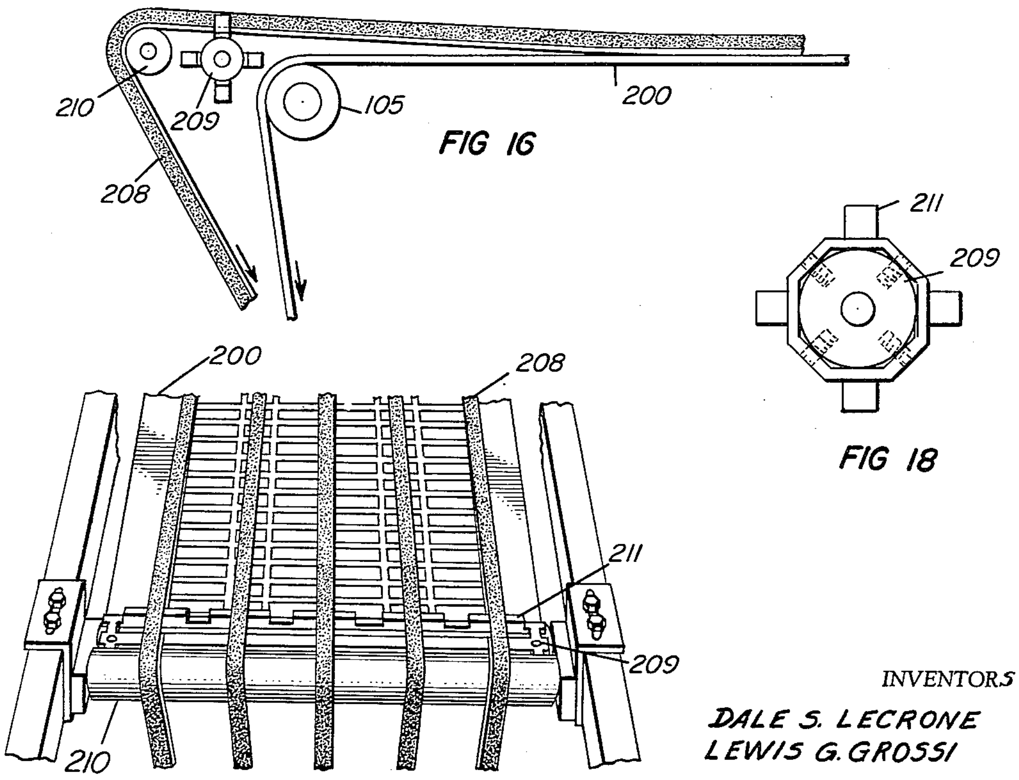
FIG. 16 is a side view at the upper upstream end of the endless perforated belt showing the modification wherein the cushion strips ride on and are carried by the inner backing sheet.
FIG. 17 is a top perspective view of FIG. 16 showing the guide turret which regulates the positioning of the cushion strips.
FIG. 18 is an end view of the turret shown in FIGS. 16 and 17.

FIGS. 16 to 18 show an inner belt 200 with separate cushion strips 208, the cushion strips being of greater length than the inner belt and passing over a turret guide 209 and roller 210 placed upstream and slightly higher than the upstream roller 105 of the main inner belt 200. By this arrangement the positioning of the cushion strips may be varied in accordance with the placement of spacers 211 in the turret head 209. As seen in FIG. 18 a set of 4 different spacer arrangements may be set up on the turret head 209 for quick and easy adjustment. Belts 208 not in use may be removed. The arrangement shown in FIGS. 16–18 may be used in each of the arrangements shown in FIGS. 3 to 7.

It will be understood also that the arrangements shown in FIGS. 3 to 7 may be accommodated by separate belt units having cushion strips laminated thereto in the preferred location. Extensive research has shown that the rectangular apertured design and dimensional relationship shown in these figures and described above satisfactorily meets the demands of the industry without undue manipulation and adjustment.

*General Design*

The machine shown is designed for movement into a conveying line when needed; it comprises a wheeled frame 46 on which are mounted the motors, power transmissions, and operating units.

Figure 8:
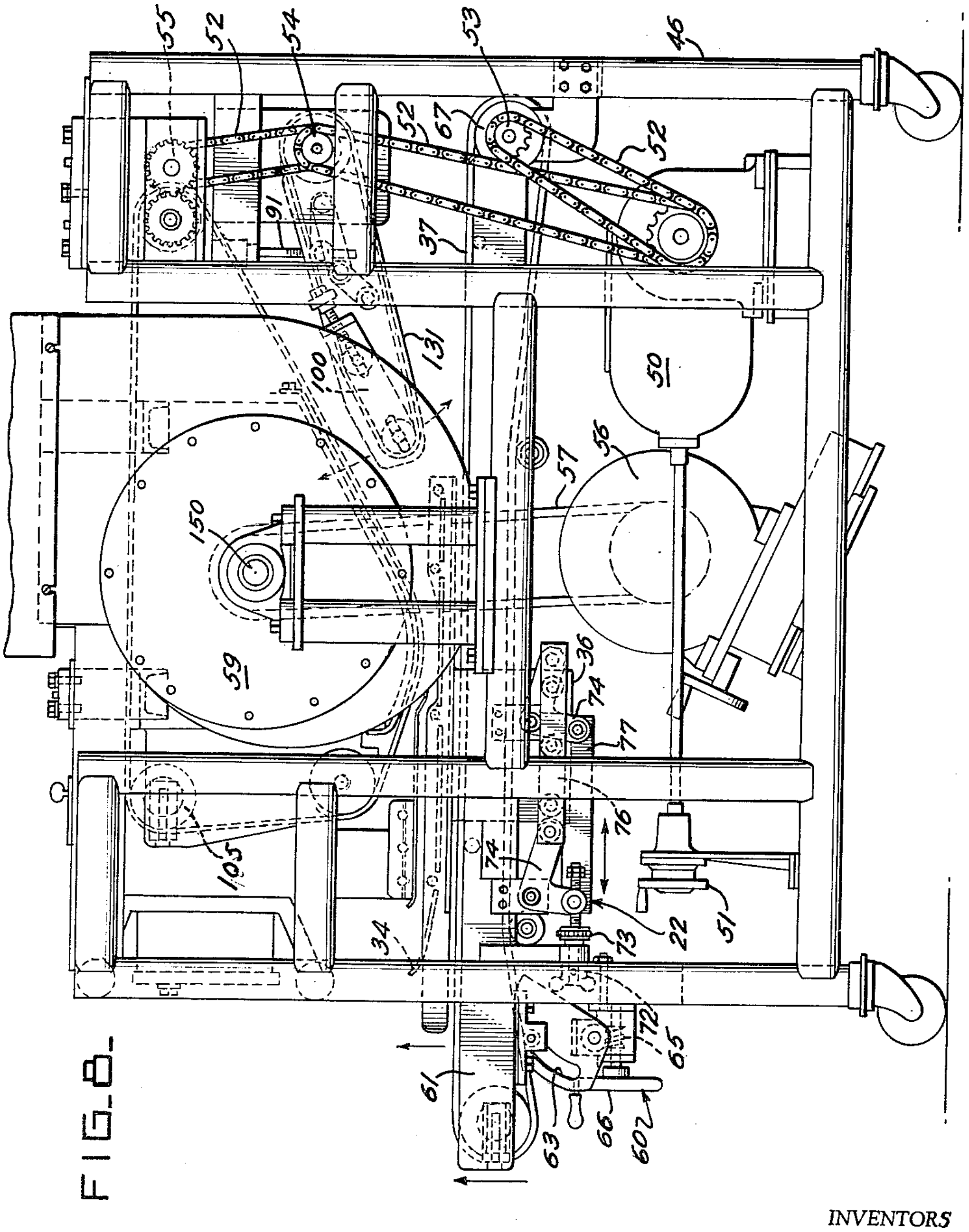
FIG. 8 is a side view of the machine.
Figure 9:
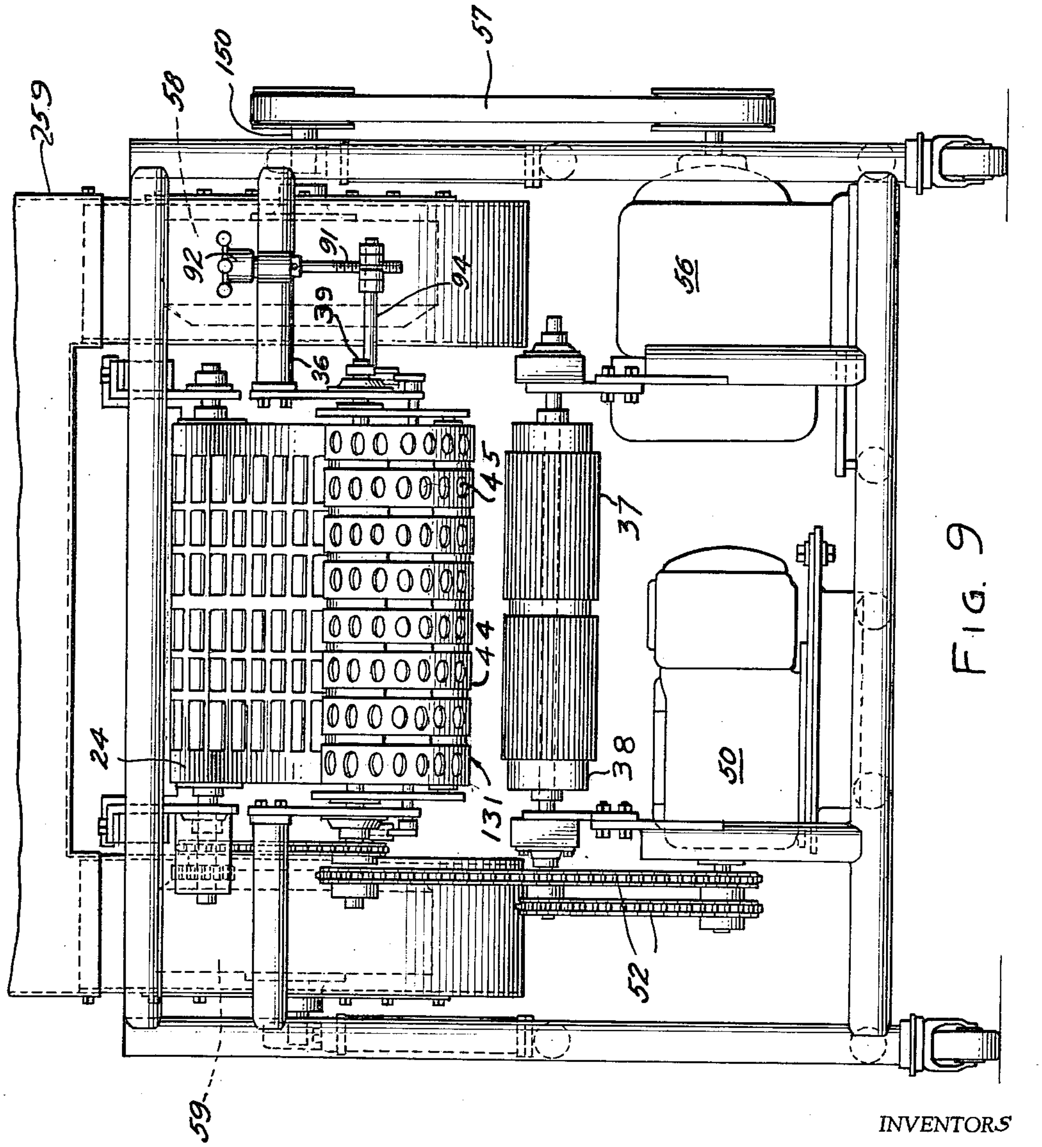
FIG. 9 is a view of the downstream end of the machine.

A variable speed motor 50 provides the prime source of power for all operating units except for the evacuating system. As seen in FIGS. 8 and 9, an adjusting wheel 51 is provided for regulating the speed of motor 50. Through sprocket belts 52 power is transmitted to the pan conveyor sprocket 53, the transfer belt sprocket 54 and the perforated belt sprocket 55. Each of the sprockets 53, 54, 55 is rotatably mounted in a suitable manner on the frame 46. The axes of the sprockets 53 and 54 define the pivot lines about which the pan conveyor 37 and the wedge transfer belt 131 respectively are pivotable for adjustment.

Also mounted on the frame 46 is a variable speed blower motor 56 which through belt 57 drives a shaft 150 on which blowers 58 and 59 are mounted, it being noted that these blowers are mounted on opposite sides of the perforated belt 24. Air is drawn by the blowers 58 and 59 from the zone inside the perforate means 24. The air is then forced upwardly into exhaust chamber 259 and from there is discharged through filters.

*Pan Conveyor Adjustment*

Figures 10, 12:
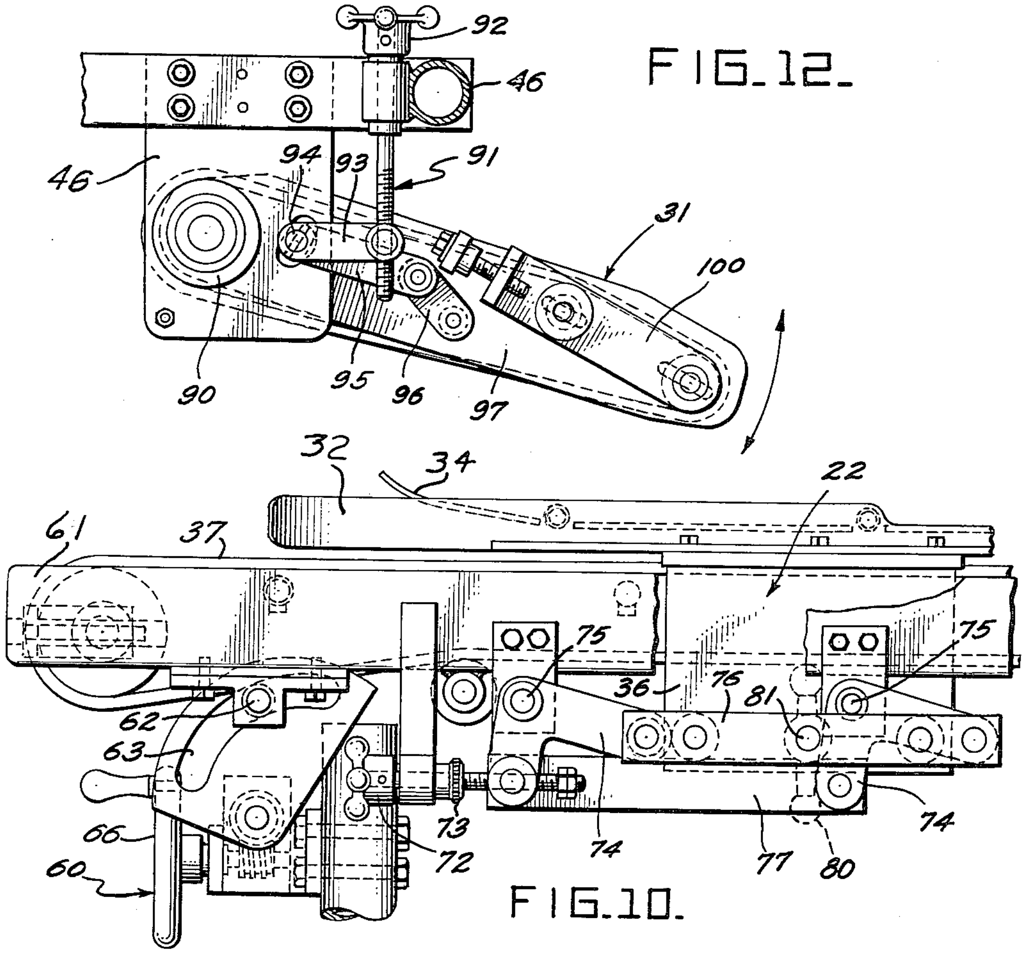
FIG. 10 is a side view of a portion of the machine of FIG. 8 showing the adjustment mechanism for the pan conveyor and for the guide means.
FIG. 12 is a side view of a portion of the right side of FIG. 9 showing the adjustment mechanism for the wedge transfer belt.
Figure 11:
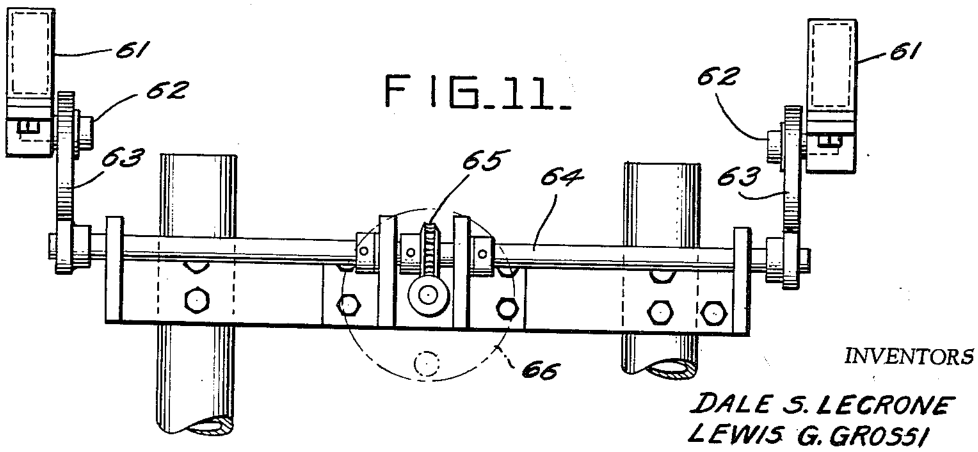
FIG. 11 is an end view of the adjustment mechanism and the pan conveyor.

As mentioned, the pan conveyor 37 is pivotally mounted at its downstream end upon the frame 46 and vertical adjustment thereof is accomplished through adjustment means generally indicated by numeral 60 (FIGS. 8, 10 and 11). The side frames 61 shown in FIG. 11 include pins 62 which seat on and are supported by the cams 63. The cams 63 in turn are fixedly mounted on the ends of transverse bar 64 which through a worm and pinion arrangement 65 is rotatable by hand wheel 66. As the radially outermost effective surfaces of the cam 63 are moved into supporting engagement with the pins 62 the side frames 61 are moved upwardly thereby moving the pan conveyor 37 about its fixed pivot point or fixed pulley 67. In this manner, the vertical dimension of the space in the removal zone may be varied to accommodate rolls of varying basic heights.

*Guide Means Adjustment*

The guide means, as mentioned, orients and aligns a pan of rolls prior to entry into the removal zone to accommodate varying pan and roll dimensions; an adjustment means generally indicated by numeral 22 is provided (FIGS. 8 and 10). The guide means 22 includes a pair of guides 32 and 32, each being mounted on a vertical base plate 36. Base plates 36 are supported by linkage systems, which are in turn mounted in a fixed fashion to their respective side frame member 61. Vertical movement of the base plates 36 is accomplished by rotation of hand knob 72, which through chain 73 transmits the rotative force to the opposite sides for accomplishing equal movement of the linkage systems. As the knob 72 is turned, the bell cranks 74, 74 are pivoted on their fixed bearings 75, 75 to move link 76 which is directly attached to the base plate 36. The movement of the hand knob 72 is transmitted by a threaded connection to one bell crank 74 and by a link 77 to the second bell crank 74.

Transverse movement of the base plates 36 is accomplished by means of a hand crank 80 shown partially in phantom in FIG. 10. The hand crank has a transversely extending screw disposed between the base plates 36 and threadedly engaged therewith. The screw 81 is journalled in link 76 and rotation thereof causes movement of the base plates 36 toward or away from each other to accommodate pans of varying widths.

*Wedge Transfer Belt Adjustment*

The downstream sprocket 54, as previously mentioned, is rotatably mounted in a fixed position on the frame 46 as seen in FIGS. 8, 9 and 12. The sprocket 54 drives a roller 90. Pivotal adjustment of the transfer belt 31 about this roller is accomplished by the transfer adjustment means indicated generally by numeral 91, which includes an adjustment knob and threaded bolt 92 rotatably mounted in the frame 46 and threadedly engaging a link 93, which in turn is affixed to a horizontal shaft 94 journalled in frame 46 (FIG. 9). Rigidly attached to the shaft 94 is a second link 95, which in turn is pivotally connected to a third link 96, the third link being fixedly journalled to the side frame 97. Through this linkage mechanism the upstream end of the wedge transfer belt 31 may be moved in an arc in the removal zone to accommodate rolls of different sizes.

As seen in FIG. 12, a belt tightening mechanism 100 is provided for regulating the tension of the belt.

*Vacuum System*

The production of a suspension force at the outer surface of the perforated belt 24 is accomplished by two suction fans mounted at opposite sides of the perforated belt 24 as seen in FIG. 9. Each fan is mounted for rotation by a common shaft 150 as seen in FIG. 9. The suction of said fans can be directed to certain areas of the perforated belt by means of baffles. A longitudinally extending center baffle (shown in phantom in FIG. 14) is provided to limit the zone of effectiveness of each blower to its portion of the suspension zone. Preferably, the intermediate or middle baffle is removable since in certain circumstances adjustment of the exhaust fan speed is sufficient to regulate the amount of suspension force required. It will be recognized that cluster rolls require less evacuating power than separate rolls.

Figure 13:
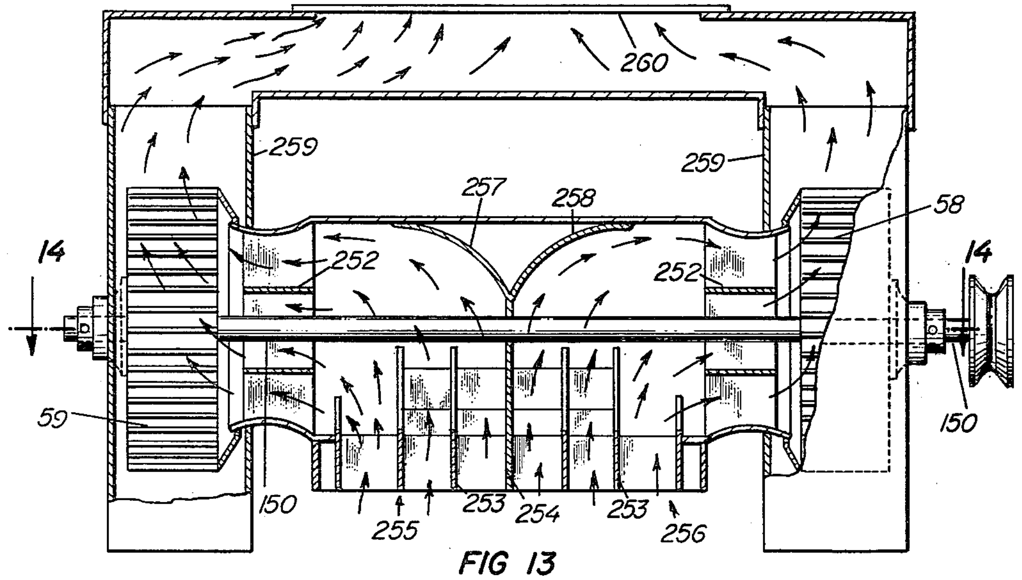
FIG. 13 is an end sectional view taken on line 13—13 of FIG. 14.
Figure 14:
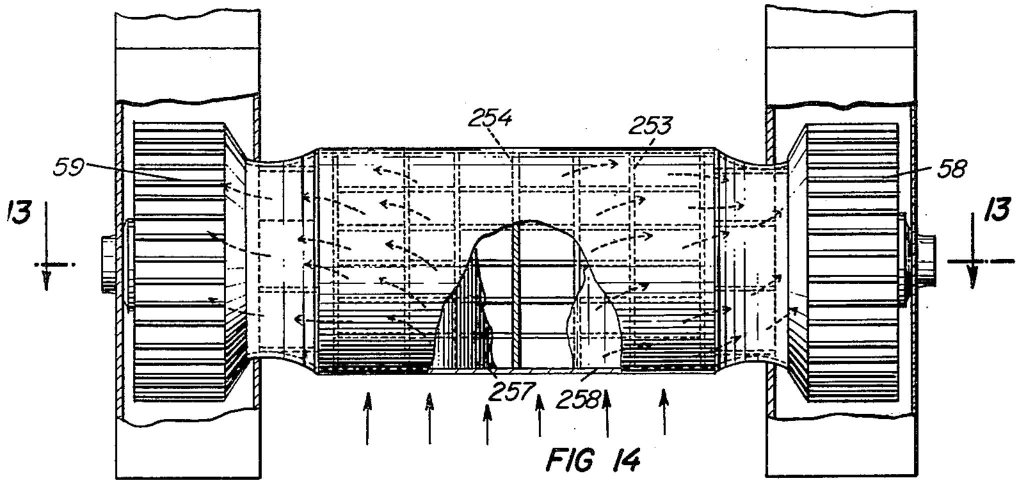
FIG. 14 is a top sectional view taken on line 14—14 of FIG. 13 with the shaft being removed for clarity.

FIGS. 13, 14 and 15 show somewhat schematically the evacuating system shown in FIGS. 8 and 9. It will be noted that two blowers 58 and 59 are provided at each side of the machine, the blowers being mounted on a common shaft 150, and being driven by motor 56 which may be adjusted to control the volume of air flow and thereby the degree of evacuation. As seen in FIG. 15, a rearward or upstream baffle 250 extends transversely of the upstream end of the suspension flight 29 and a forward or downwstream baffle 251 extends transversely at about the midpoint of the suspension flight 29. It will be recognized, therefore, that a suspension force or bias is placed on the rolls immediately after movement past baffle 250 and that this suspension force is maintained until the rolls reach a point downstream of the upstream end of the wedge transfer belt 31 where baffle 251 shuts off the evacuating effect on the suspension flight 29. The rolls are then free to be carried away by the transfer top flight 30.

FIG. 15 is a schematic sectional view taken through the longitudinal side line showing the egg crate-type baffle 252 through which the air passes to the blower 58; one of these egg crate-type baffles 252 is provided in the intake of each blower 58 and 59.

FIG. 14 shows the somewhat similar vertical baffles 253 which form an egg crate-type baffle device immediately above the suspension flight 29. It will be noted in FIG. 13 that a vertical baffle 254 is provided at the longitudinal center line, this baffle defining the two independent evacuated portions 255 and 256 of the suspension flight 29. At the upper portion of this baffle, curved baffles 257 and 258 aid in directing the two air flows to their respective egg crate-type baffle 252. Upon leaving the blowers 58, 59, the air passes through passageways 259 and then outwardly through filter 260.

Referring now to FIG. 15, it will be seen that a guide plate 261 is provided between the baffle 253 and the suspension flight 29, this guide plate having longitudinally extending curved strips conforming to the longitudinally extending portions of the inner belt latticework 205 of the backing sheet 200. In this manner, the belt is backed effectively and smoothly.

In a normal operation, the machine of the instant application will handle about 50 pans per minute, this being a rather major advance over previously known methods where such production ranges as 12 pans per minute are considered normal.

The cushion strips 201 as well as the holes 45 in transfer belt 30 enable rapid operation of this machine as the incoming air is channeled in a controlled manner and displacement of rolls leaving the suspension zone is completely eliminated. No wedging of the rolls between the belts takes place. The holes 45 allow air to go up against the bottom of the rolls and thereby prevent damaging and severe countercurrent flow against the rolls which otherwise would cause the rolls to tip upwardly and possibly wedge between the belts. The rolls are handled in a fashion such that they are released and transferred to the transfer belt 30 in a manner wherein compression or wedging of the rolls is avoided.

It will be understood, therefore, that the rolls are guided in a predetermined manner into position for suspension and conveyance in a suspended manner to a final transfer or discharge belt, the empty pan passing beneath the transfer belt. The suspension and deposition is accomplished without wedging of the rolls by specific belt designs whereby air flow is controlled to aid in the accomplishment of the desired end. The foregoing description and drawings may suggest various modifications, which modifications are deemed to be within the scope of the invention as defined by the appended claims.

We claim:

1. In a mechanism, an endless belt for engaging and suspending through vacuum a soft compressible product comprising an endless product engaging skin of predetermined thickness and softness to enable deforming contact thereof with said product without material deformation of the product, and an inner backing sheet comprising longitudinally extending side panels and a latticework extending therebetween, said latticework defining longitudinally extending rows of openings having their longest dimension extending transversely of the sheet; and vacuum means for producing a vacuum at said skin by drawing air through said openings.

2. In a mechanism, an endless belt for engaging and suspending through vacuum a soft compressible product comprising an endless inner backing sheet having longitudinally extending side panels and a latticework extending therebetween, said latticework defining longitudinally extending rows of openings having their longest dimension extending transversely of the sheet, and a plurality of narrow cushion strips having their inner surfaces in frictional face to face engagement with the outer surface of said backing sheet, the outer portion of said cushion strips being a product engaging skin of predetermined thickness and softness to enable deforming contact thereof with said product without material deformation of the product; and vacuum means for producing a vacuum at said skin by drawing air through said openings.

3. A mechanism for removing rolls from their pan comprising moving means for moving the pan downstream through a removal zone and a suspension zone; guide means for directing the pan through a predetermined path through said removal zone; an endless belt for engaging and suspending through vacuum a soft compressible product comprising an endless inner backing sheet having longitudinally extending side panels and a latticework extending therebetween, said latticework defining longitudinally extending rows of openings having their longest dimension extending transversely of the sheet, and a plurality of narrow cushion strips having their inner surfaces in frictional face to face engagement with the outer surface of said backing sheet, the outer portion of said cushion strips being a product engaging skin of predetermined thickness and softness to enable deforming contact thereof with said product without material deformation of the product; means for moving said belt over said predetermined path in engagement with said rolls; means for producing a vacuum at said skin to exert a suspension force, means nullifying the vacuum at the downstream end of the suspension zone, transfer means positioned below and extending downstream of the suspension zone for receipt of the released rolls, said transfer means including an endless conveying means having apertures therethrough to enable the passage of air therethrough to and through said endless belt.

4. In a mechanism, an endless belt means for engaging and suspending through vacuum a soft compressible product comprising an endless inner backing member having openings therethrough, and a plurality of separate narrow longitudinally extending cushion strips having their inner surfaces in frictional face to face engagement with the outer surface of said backing member, the outer portion of said cushion strips being a product engaging skin of predetermined thickness and softness to enable deforming contact thereof with said product without material deformation of the product, said strips serving to spread the suspension force over a substantial area of the product and aid in channeling and controlling the flow of incoming air, and a vacuum means for producing a vacuum at said skin by drawing air through said openings.

5. In a mechanism as defined in claim 4 and including adjusting means for adjusting the transverse spacing of said cushion strips to accommodate various size products.

6. In a mechanism as defined in claim 5 and wherein said cushion strips are of greater length than said backing member and said adjusting means is disposed between said strips and member.

7. In a mechanism for removing a soft compressible product from a support comprising means for moving the support downstream through a removal zone and a suspension zone, guide means for directing the support through a predetermined path through said removal zone, an endless belt means for engaging and suspending through vacuum said soft compressible product including an endless inner backing member having openings therethrough, and a plurality of separate narrow longitudinally extending cushion strips having their inner surfaces in frictional face to face engagement with the outer surface of said backing member, the outer portion of said cushion strips being a product engaging skin of predetermined thickness and softness to enable deforming contact thereof with said product without material deformation of the product, said strips serving to spread the suspension force over a substantial area of the product and aid in channeling and controlling the flow of incoming air, means for moving said endless belt means over said predetermined path in engagement with said product, vacuum means for producing a vacuum at said skin by drawing air through said openings to exert a suspension force at said suspension zone, means nullifying the vacuum at the downstream end of the suspension zone to release the suspended product, transfer means positioned below and extending downstream of the suspension zone for receipt of the released product.

8. In a mechanism as defined in claim 7 and wherein said transfer means includes an endless conveying means having apertures therethrough to enable the passage of air therethrough to and through said openings of said endless inner backing member.

9. In a mechanism as defined in claim 7 and including adjusting means for adjusting the transverse spacing of said cushion strips to accommodate various size products.

10. In a mechanism as defined in claim 9 and wherein said cushion strips are of greater length than said backing member and said adjusting means is disposed between said strips and member.

References Cited in the file of this patent

UNITED STATES PATENTS

| | | |
|---|---|---|
| 1,474,768 | Dudley et al. | Nov. 20, 1923 |
| 2,445,884 | MacManus | July 27, 1948 |
| 2,527,337 | Simpson | Oct. 24, 1950 |
| 2,685,975 | Bruce et al. | Aug. 10, 1954 |
| 2,837,042 | Laval | June 3, 1958 |
| 2,905,309 | Makrides | Sept. 22, 1959 |
| 2,927,707 | Reed et al. | Mar. 8, 1960 |
| 2,975,920 | Reed et al. | Mar. 21, 1961 |